US009753277B2

(12) United States Patent
Chang et al.

(10) Patent No.: US 9,753,277 B2
(45) Date of Patent: Sep. 5, 2017

(54) WAVELENGTH CONVERSION DEVICE

(71) Applicant: DELTA ELECTRONICS, INC., Taoyuan (TW)

(72) Inventors: Keh-Su Chang, Taoyuan (TW); Yen-I Chou, Taoyuan (TW); Chi Chen, Taoyuan (TW); Chun-Hsien Lu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 9 days.

(21) Appl. No.: 15/140,457

(22) Filed: Apr. 27, 2016

(65) Prior Publication Data
US 2017/0045732 A1 Feb. 16, 2017

Related U.S. Application Data

(60) Provisional application No. 62/203,401, filed on Aug. 11, 2015.

(30) Foreign Application Priority Data

Jan. 8, 2016 (TW) .............................. 105100468 A

(51) Int. Cl.
*G02B 5/08* (2006.01)
*G02B 26/00* (2006.01)
*G02B 5/22* (2006.01)
*G02B 5/26* (2006.01)

(52) U.S. Cl.
CPC ............. *G02B 26/008* (2013.01); *G02B 5/08* (2013.01); *G02B 5/22* (2013.01); *G02B 5/223* (2013.01); *G02B 5/226* (2013.01); *G02B 5/26* (2013.01)

(58) Field of Classification Search
CPC . G02B 5/08; G02B 5/22; G02B 5/223; G02B 5/26; G02B 26/008
USPC .......................................................... 359/884
See application file for complete search history.

(56) References Cited

U.S. PATENT DOCUMENTS

| 2006/0216477 | A1* | 9/2006 | Peng ................. G02F 1/133555 428/143 |
| 2006/0290844 | A1* | 12/2006 | Epstein ............. G02F 1/133615 349/113 |
| 2007/0145884 | A1* | 6/2007 | Wu ........................ H05B 33/10 313/503 |
| 2011/0156081 | A1* | 6/2011 | De Carvalho Esteves .................. C09K 11/02 257/98 |
| 2012/0068594 | A1* | 3/2012 | Ibbetson ............... H01L 33/501 313/501 |

(Continued)

FOREIGN PATENT DOCUMENTS

TW 201501366 A 1/2015

*Primary Examiner* — Ricky D Shafer
(74) *Attorney, Agent, or Firm* — CKC & Partners Co., Ltd.

(57) ABSTRACT

A wavelength conversion device includes a substrate, a reflective member, and a wavelength conversion member. The reflective member is disposed on the substrate and includes a continuous-phase material and nano particles. The nano particles are distributed in the continuous-phase material. A refractive index of the continuous-phase material is different from a refractive index of the nano particles. The wavelength conversion member is disposed on the reflective member. The reflective member is configured to reflect the light converted from the wavelength conversion member to output.

18 Claims, 4 Drawing Sheets

(56) References Cited

U.S. PATENT DOCUMENTS

2013/0256728 A1* 10/2013 Park .................. H01L 33/60
  257/98
2015/0168602 A1  6/2015 Kambe et al.

* cited by examiner

WAVELENGTH CONVERSION DEVICE

RELATED APPLICATIONS

This application claims priority to U.S. Provisional Application Ser. No. 62/203,401, filed Aug. 11, 2015 and Taiwan Application Serial Number 105100468, filed Jan. 8, 2016, which are herein incorporated by reference.

BACKGROUND

Technical Field

The present disclosure relates to a wavelength conversion device, and more particularly, to a color wheel device.

Description of Related Art

A conventional color wheel with reflective phosphor powder includes a substrate coated with a highly reflective layer, and phosphor powder is coated on the highly reflective layer. The highly reflective layer is configured to forwardly reflect the light generated by exciting the phosphor powder with laser. In general, a metal reflective layer, a dielectric multi-layer reflective film, or a metal/dielectric multi-layer reflective film can be used as the highly reflective layer.

However, the performance of the color wheel with reflective phosphor powder is greatly influenced by the refractive index of the substrate. Therefore, in designing the highly reflective layer, an angle and a wavelength of incident light are often considered. When the reflective structure with multiple dielectric layers is used, the reflective requirements of full incident angles and full wavelength spectrums have to be met, thus greatly increasing the number of dielectric layers. When the film-coating process is complicated, reliability of the films is decreased and the cost is significantly increased. Therefore, the dielectric multi-layer reflective film is often greatly influenced by the conditions of the incident light. Although the metal reflective layer may not need to consider the incident angle, yet the metal reflective layer is easily oxidized and corroded, and thus the stability of the metal reflective layer is poor.

Furthermore, the phosphor powder is mixed with a glue before being coated onto the highly reflective layer, so that photons generated by the phosphor powder enter the highly reflective layer from a colloidal environment having a refractive index of from about 1.4 to about 1.5. The colloidal environment is different from the general ambient environment of which the refractive index is equal to 1. Owing to the Brewster Angle Effect, a portion of the incident light with a large incident angle may be polarized and penetrate the highly reflective layer and be absorbed by the substrate, thus decreasing the light output of the phosphor powder color wheel.

SUMMARY

In view of the foregoing problem, the present disclosure provides a wavelength conversion device which can meet the reflective requirements of full incident angles and full wavelength spectrums.

According to an embodiment, the present disclosure provides a wavelength conversion device. The wavelength conversion device includes a substrate, a reflective member, and a wavelength conversion member. The reflective member is disposed on the substrate. The reflective member includes a continuous-phase material and nano particles. The nano particles are dispersively distributed in the continuous-phase material. A refractive index of the continuous-phase material is different from a refractive index of the nano particles. The wavelength conversion member is disposed on the reflective member. The reflective member is configured to reflect the light converted from the wavelength conversion member to output.

In an embodiment of the present disclosure, the continuous-phase material is an organic material or an inorganic material.

In an embodiment of the present disclosure, the organic material is acrylic, silicone, epoxy, TPX, compound resin, or glass-related rubber.

In an embodiment of the present disclosure, a refractive index of the organic material is in a range from about 1.3 to about 1.55.

In an embodiment of the present disclosure, the inorganic material is transparent oxide-based glass.

In an embodiment of the present disclosure, the inorganic material includes an oxide of a combination including at least one of selenium, phosphorus, boron, bismuth, aluminum, zirconium, zinc, alkali metal elements, and alkaline earth elements.

In an embodiment of the present disclosure, a refractive index of the inorganic material is in a range from about 1.4 to about 1.6.

In an embodiment of the present disclosure, the wavelength conversion member includes the inorganic material.

In an embodiment of the present disclosure, a thickness of the reflective member is in a range from about 10 um to about 3 mm.

In an embodiment of the present disclosure, the thickness of the reflective member is further in a range from about 30 um to about 500 um.

In an embodiment of the present disclosure, a material forming the nano particles include at least one of silicon dioxide, bubble, tantalum oxide, titanium oxide, magnesium fluoride, and barium sulfate.

In an embodiment of the present disclosure, a particle diameter of the nano particles is in a range from about 50 nm to about 500 nm.

In an embodiment of the present disclosure, the particle diameter of the nano particles is further in a range from about 100 nm to about 400 nm.

In an embodiment of the present disclosure, a concentration of the nano particles in the reflective member is in a range from about 30 wt % to about 95 wt %.

In an embodiment of the present disclosure, the concentration of the nano particles in the reflective member is further in a range from about 50 wt % to about 90 wt %.

In an embodiment of the present disclosure, a difference between the refractive index of the continuous-phase material and the refractive index of the nano particles is equal to or greater than 0.5.

In an embodiment of the present disclosure, the nano particles could be more than one material. The nano particles include first sub-nano particles and second sub-nano particles. A refractive index of the first sub-nano particles is greater than the refractive index of the continuous-phase material. A refractive index of the second sub-nano particles is smaller than the refractive index of the continuous-phase material.

In an embodiment of the present disclosure, the wavelength conversion member is a phosphor powder layer.

Accordingly, in the reflective member of the wavelength conversion device of the present disclosure, the nano particles are dispersively distributed in the continuous-phase material, and light can be reflected at the interface between the continuous-phase material and any nano particle because the refractive index difference between the continuous-phase material and the nano particles. By adjusting the particle diameter and the concentration of the nano particles, a reflection mechanism similar to the conventional dielectric multi-layer reflective film can be achieved, so that the reflective requirements of full incident angles and full wavelength spectrums can be met. Furthermore, the wavelength conversion device of the present disclosure can effectively enhance the total output brightness by preparing the reflective member with an appropriate recipe on the substrate, so that the wavelength conversion device further has advantages of simple processes and low cost.

It is to be understood that both the foregoing general description and the following detailed description are by examples, and are intended to provide further explanation of the present disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
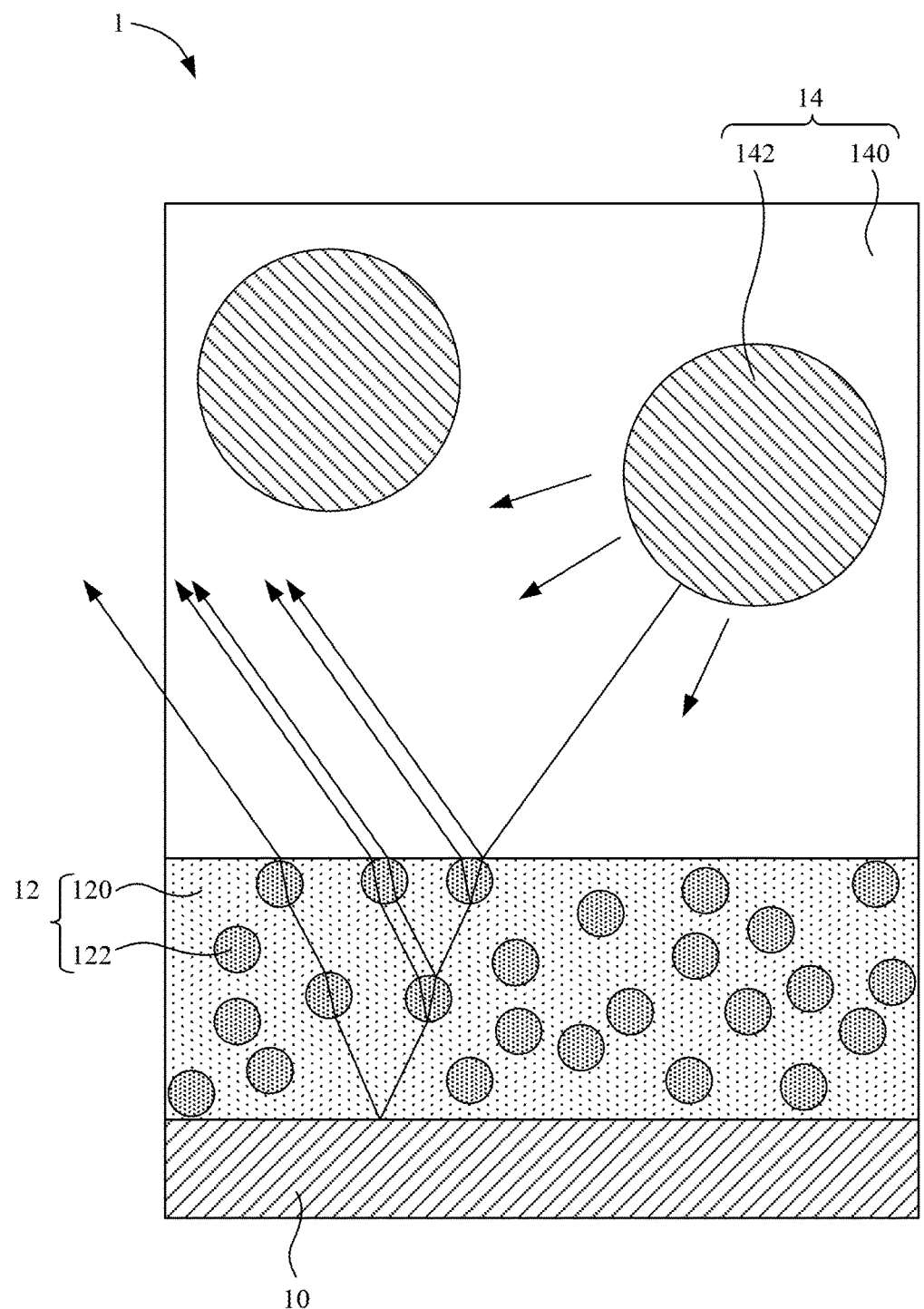
FIG. 1 is a schematic diagram of a wavelength conversion device according to an embodiment of the present disclosure.

Reference will now be made in detail to the present embodiments of the present disclosure, examples of which are illustrated in the accompanying drawings. Wherever possible, the same reference numbers are used in the drawings and the description to refer to the same or like parts.

Reference is made to FIG. 1. FIG. 1 is a schematic diagram of a wavelength conversion device 1 according to an embodiment of the present disclosure.

As shown in FIG. 1, in the embodiment, the wavelength conversion device 1 includes a substrate 10, a reflective member 12, and a wavelength conversion member 14. The reflective member 12 is disposed on the substrate 10. The reflective member 12 includes a continuous-phase material 120 and nano particles 122. The nano particles 122 are dispersively distributed in the continuous-phase material 120. A refractive index of the continuous-phase material 120 is different from a refractive index of the nano particles 122. The wavelength conversion member 14 is disposed on the reflective member 12. That is, the substrate 10, the reflective member 12, and the wavelength conversion member 14 form a sandwich structure. In some embodiments, the wavelength conversion member 14 is a phosphor powder layer, but the present disclosure is not limited in this regard. While being irradiated by light (e.g., laser light), the phosphor powder layer can be excited to emit light, so as to serve as a light-emitting layer of the wavelength conversion device 1. The reflective member 12 is configured to reflect the light converted from the wavelength conversion member 14 to output.

With the above structural configuration, it can be seen that the wavelength conversion device 1 has the structure including the nano particles 122 dispersively distributed in the continuous-phase material 120, and the refractive index of the continuous-phase material 120 is different from the refractive index of the nano particles 122, so as to reflect light at the interface between the continuous-phase material 120 and any nano particle 122. Moreover, if the difference between the refractive index of the continuous-phase material 120 and the refractive index of the nano particles 122 becomes larger, the reflection at the interface between the continuous-phase material 120 and any nano particle 122 becomes larger, and the reflective angle also becomes larger.

In some embodiments, the difference between the refractive index of the continuous-phase material and the refractive index of the nano particles is equal to or greater than 0.5, but the present disclosure is not limited in this regard.

In general, in designing the conventional dielectric multi-layer reflective film, the thickness of a film is determined as the quarter wavelength of the light to be reflected. As a result, to meet the reflective requirements of full incident angles and full wavelength spectrums, the number of films in the conventional dielectric multi-layer reflective film often approaches to one hundred. The coating process is complicated.

In contrast, in the nano-discrete reflective member 12 of the wavelength conversion device 1 in the embodiment of the present disclosure, the nano particles 122 having a high refractive index are dispersively distributed into the continuous-phase material 120 having a low refractive index (vice versa), and by adjusting the particle diameter and the concentration of the nano particles 122, a reflection mechanism similar to the conventional dielectric multi-layer reflective film can be achieved, which can meet the reflective requirements of full incident angles and full wavelength spectrums more easily than the conventional dielectric multi-layer reflective film. Furthermore, the wavelength conversion device 1 in some embodiments of the present disclosure can effectively enhance the total output brightness by preparing the reflective member 12 with an appropriate recipe on the substrate 10, so that the wavelength conversion device 1 further has advantages of simple processes and low cost.

More specifically, the concentration of the nano particles 122 is used to adjust the distance between any two adjacent nano particles 122 in the continuous-phase material 120. By further collaborating with the adjustment of the particle diameter of the nano particles 122, various thickness combinations can be achieved within a very small thickness, so as to effectively achieve reflections of full wavelength spectrums.

In some embodiments, the particle diameter of the nano particles 122 is in a range from about 50 nm to about 500 nm. More specifically, the particle diameter of the nano particles 122 is further in a range from about 100 nm to about 400 nm. When the particle diameter of the nano particles 122 is smaller than 400 nm, visible light can be ignored and penetrate the nano particles 122. When the particle diameter of the nano particles 122 is greater than 100 nm, the resonance absorption of the plasmons on the surfaces of the nano particles 122 and the visible light can be avoided.

In some embodiments, the concentration of the nano particles 122 in the reflective member 12 is in a range from about 30 wt % to about 95 wt %. More specifically, the concentration of the nano particles in the reflective member is further in a range from about 50 wt % to about 90 wt %.

In some embodiments, the continuous-phase material 120 is an organic material. For example, the organic material is acrylic, silicone, epoxy, TPX, compound resin, or glass-related rubber. In some embodiments, a refractive index of the organic material is in a range from about 1.3 to about 1.55. In order to increase the difference between the refractive index of the continuous-phase material 120 and the refractive index of the nano particles 122, the nano particles 122 having high refractive index materials (e.g., TiOx, TaOx, and etc.) or the nano particles 122 having low refractive index materials (e.g., air, magnesium fluoride, silicon dioxide, and etc.) can be added in the continuous-phase material 120.

In some embodiments, the continuous-phase material 120 made of the foregoing organic materials can be formed by slurry-coating, dropping, or printing.

In some embodiments, the material forming the nano particles 122 includes at least one of silicon dioxide, bubble, tantalum oxide, titanium oxide, magnesium fluoride, and barium sulfate, but the present disclosure is not limited in this regard.

In some embodiments, a thickness of the reflective member 12 is in a range from about 10 um to about 3 mm. More specifically, the thickness of the reflective member is further in a range from about 30 um to about 500 um, but the present disclosure is not limited in this regard.

Figure 2:
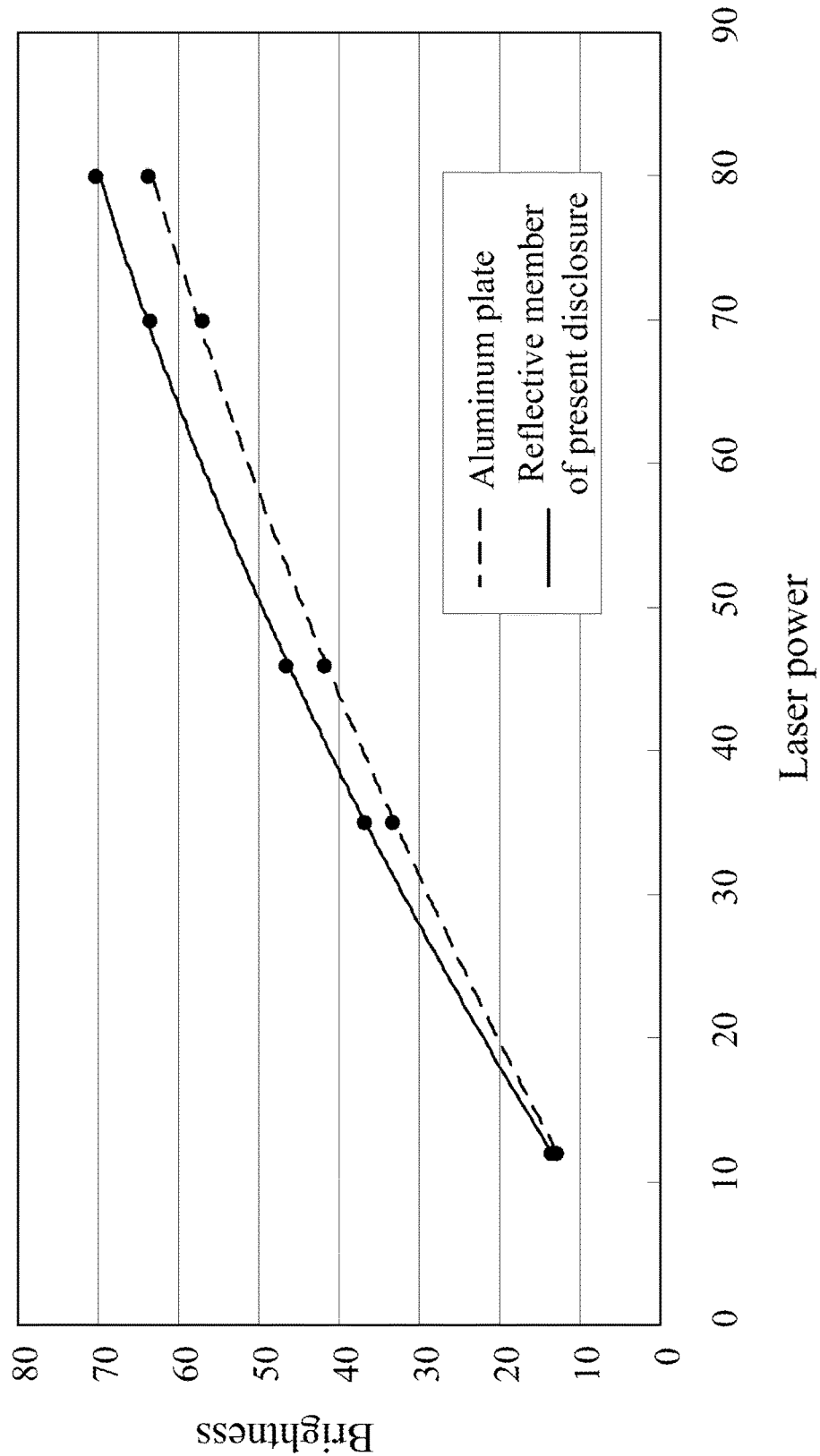
FIG. 2 illustrates curves of normalized power output versus laser power for a wavelength conversion device and an aluminum plate according to an embodiment of the present disclosure.

Reference is made to FIG. 2. FIG. 2 illustrates curves of normalized power output versus laser power for a wavelength conversion device 1 and an aluminum plate according to an embodiment of the present disclosure.

As shown in FIG. 2, in the embodiment, the wavelength conversion device 1 is compared with the aluminum plate having an reflectivity of 95%, and the brightness experiments of the wavelength conversion device 1 and the aluminum plate are conducted by using laser light sources with the same power. The continuous-phase material 120 used in the reflective member 12 of the wavelength conversion device 1 is silicone rubber (its refractive index is about 1.5). The nano particles 122 used in the reflective member 12 are hollow glass beads (or called glass bubble) (each having a refractive index of about 1.0). A thickness of each of the nano particles 122 is about 200 nm. A concentration of the nano particles 122 is in a range from about 10 wt % to about 30 wt %. As shown in FIG. 2, the experiments clearly show that the brightness of the reflected light of (i.e., normalized power output) of the wavelength conversion device 1 of the embodiment is greater than that of the aluminum plate by about 5%.

Figure 3:
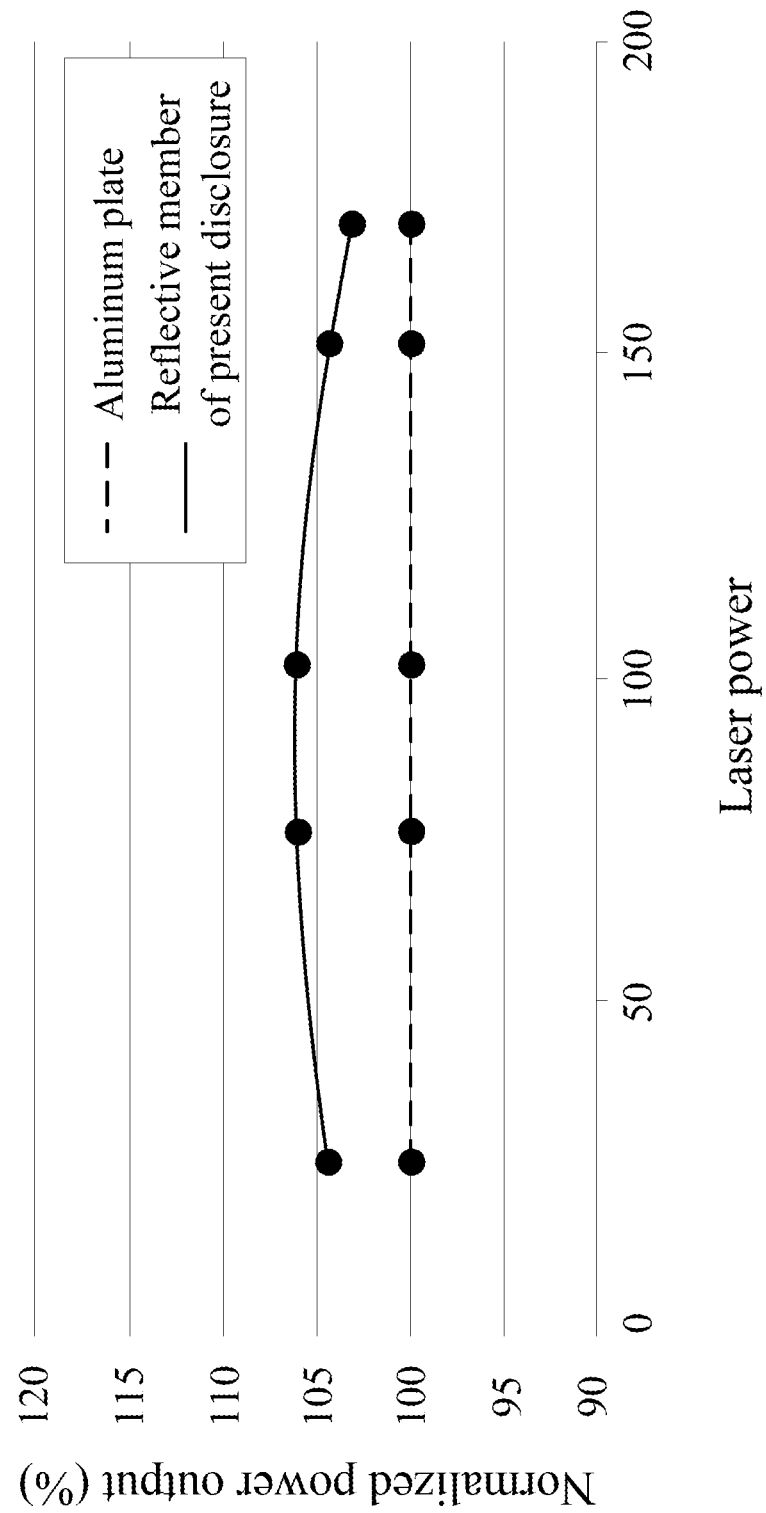
FIG. 3 illustrates curves of brightness versus laser power for a wavelength conversion device and an aluminum plate according to an embodiment of the present disclosure.

Reference is made to FIG. 3. FIG. 3 illustrates curves of brightness versus laser power for a wavelength conversion device 1 and an aluminum plate according to an embodiment of the present disclosure.

As shown in FIG. 3, in the embodiment, the wavelength conversion device 1 is also compared with the aluminum plate having an reflectivity of 95%, and the brightness experiments of the wavelength conversion device 1 and the aluminum plate are conducted by using laser light sources with the same power. The continuous-phase material 120 used in the reflective member 12 of the wavelength conversion device 1 is silicone rubber (its refractive index is about 1.5). The material forming the nano particles 122 used in the reflective member 12 is silicon dioxide (its refractive index is about 2.4). A thickness of each of the nano particles 122 is about 300 nm. A concentration of the nano particles 122 is in a range from about 30 wt % to about 50 wt %. As shown in FIG. 3, the experiments clearly show that the brightness of the reflected light of the wavelength conversion device 1 of the embodiment is greater than that of the aluminum plate for about 10%.

Furthermore, compared with the embodiment of FIG. 2, the difference between the refractive index of the continuous-phase material 120 and the refractive index of the nano particles 122 in the present embodiment (about 0.9) is larger, and thus the present embodiment has greater reflectivity and brightness gains than the embodiment of FIG. 2. Accordingly, the operating principle (i.e. a large difference between the refractive index of the continuous-phase material 120 and the refractive index of the nano particles 122 leads to a large reflective index at the interface between the continuous-phase material 120 and any nano particle 122) provided in the present disclosure is verified.

As shown by the curves of FIG. 2 and FIG. 3 and the above experimental data, it can be seen that, compared with the aluminum plate, the wavelength conversion device 1 of the embodiment of the present disclosure indeed can effectively improve the overall output brightness.

In some embodiments, the continuous-phase material 120 of the reflective member 12 is an inorganic material. For example, the inorganic material includes a ceramic oxide, such as transparent oxide-based glass. More specifically, the inorganic material includes an oxide of a combination including at least one of selenium, phosphorus, boron, bismuth, aluminum, zirconium, zinc, alkali metal elements, alkaline earth elements, but the present disclosure is not limited in this regard. In some embodiments, the refractive index of the inorganic material is in a range from about 1.4 to about 1.6. By using the continuous-phase material 120 formed from the foregoing inorganic materials to adhere the nano particles 122, the wavelength conversion device 1 of the present disclosure can be applied to high power products.

In some embodiments, the wavelength conversion member 14 also includes the foregoing inorganic materials. More specifically, the wavelength conversion member 14 includes a binder 140 and phosphor particles 142, and the binder 140 can be formed from the foregoing inorganic materials. Therefore, the wavelength conversion device 1 of the present disclosure is more applicable to high power products.

In some embodiments, the continuous-phase material 120 and/or the binder 140 can be formed from the foregoing inorganic materials by first performing a coating process for deposition and then performing a high temperature process for sintering or melting.

In some embodiments, the substrate 10 can be formed from glass, metals (e.g., aluminum), ceramics, or semiconductor materials, but the present disclosure is not limited in this regard.

In some embodiments, the wavelength conversion device 1 is a reflective color wheel, but the present disclosure is not limited in this regard.

Figure 4:
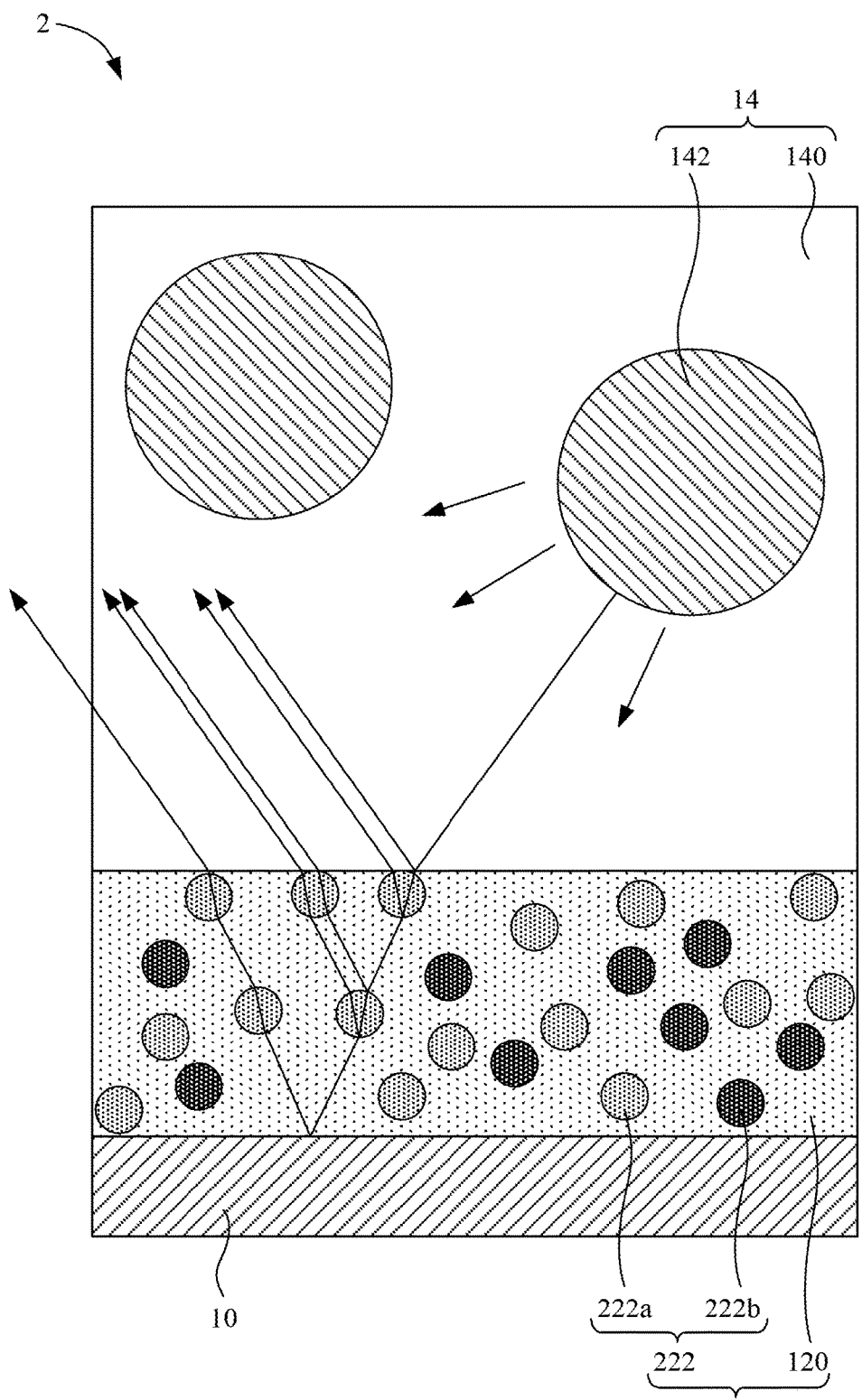
FIG. 4 is a schematic diagram of a wavelength conversion device according to another embodiment of the present disclosure.

Reference is made to FIG. 4. FIG. 4 is a schematic diagram of a wavelength conversion device 2 according to another embodiment of the present disclosure.

As shown in FIG. 4, in the embodiment, the wavelength conversion device 2 includes the substrate 10, a reflective member 22, and the wavelength conversion member 14. The substrate 10 and the wavelength conversion member 14 are similar to those in the embodiment of FIG. 1, and this the descriptions about those components are not stated again herein to avoid duplicity. It should be pointed out that the nano particles 222 of the reflective member 22 could be more than one material. For example, the nano particles 222 further include first sub-nano particles 222a and second sub-nano particles 222b. A refractive index of the first sub-nano particles 222a is greater than the refractive index of the continuous-phase material 120. A refractive index of the second sub-nano particles 222b is smaller than the refractive index of the continuous-phase material 120. That is, both the first sub-nano particles 222a and the second sub-nano particles 222b are uniformly distributed in the same continuous-phase material 120 (i.e., share the same continuous-phase material 120). In contrast, regarding the conventional dielectric multi-layer reflective film, the films can only be stacked. To achieve a reflection effect similar to that of the present embodiment, the thickness of the conventional stacked films is certainly greater than the thickness of the reflective member 22 of the present embodiment. Therefore, compared with the conventional dielectric multi-layer reflective film, the reflective member 22 of the present embodiment can reduce the thickness.

According to the foregoing descriptions of the embodiments of the present disclosure, it can be seen that, in the reflective member of the wavelength conversion device of the present disclosure, the nano particles are dispersively distributed in the continuous-phase material, and light can be reflected at the interface between the continuous-phase material and any nano particle because the refractive index difference between the continuous-phase material and the nano particles. By adjusting the particle diameter and the concentration of the nano particles, a reflection mechanism similar to the conventional dielectric multi-layer reflective film can be achieved, so that the reflective requirements of full incident angles and full wavelength spectrums can be met. Furthermore, the wavelength conversion device of the present disclosure can effectively enhance the total output brightness by preparing the reflective member with an appropriate recipe on the substrate, so that the wavelength conversion device further has advantages of simple processes and low cost.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims.

What is claimed is:

1. A wavelength conversion device, comprising:
   a substrate;
   a reflective member disposed on the substrate, the reflective member comprising:
      a continuous-phase material; and
      a plurality of nano particles distributed in the continuous-phase material, wherein a refractive index of the continuous-phase material is different from a refractive index of the nano particles; and
   a wavelength conversion member disposed on the reflective member,
   wherein the reflective member is configured to reflect the light converted from the wavelength conversion member to output.

2. The wavelength conversion device of claim 1, wherein the continuous-phase material is an organic material or an inorganic material.

3. The wavelength conversion device of claim 2, wherein the organic material is acrylic, silicone, epoxy, TPX, compound resin, or glass-related rubber.

4. The wavelength conversion device of claim 2, wherein a refractive index of the organic material is in a range substantially from 1.3 to 1.55.

5. The wavelength conversion device of claim 2, wherein the inorganic material is transparent oxide-based glass.

6. The wavelength conversion device of claim 2, wherein the inorganic material comprises an oxide of a combination comprising at least one of selenium, phosphorus, boron, bismuth, aluminum, zirconium, zinc, alkali metal elements, alkaline earth elements.

7. The wavelength conversion device of claim 2, wherein a refractive index of the inorganic material is in a range substantially from 1.4 to 1.6.

8. The wavelength conversion device of claim 2, wherein the wavelength conversion member comprises the inorganic material.

9. The wavelength conversion device of claim 1, wherein a thickness of the reflective member is in a range substantially from 10 um to 3 mm.

10. The wavelength conversion device of claim 9, wherein the thickness of the reflective member is further in a range substantially from 30 um to 500 um.

11. The wavelength conversion device of claim 9, wherein a material forming the nano particles comprises at least one of silicon dioxide, bubbles, tantalum oxide, titanium oxide, magnesium fluoride, and barium sulfate.

12. The wavelength conversion device of claim 1, wherein a particle diameter of the nano particles is in a range substantially from 50 nm to 500 nm.

13. The wavelength conversion device of claim 12, wherein the particle diameter of the nano particles is further in a range substantially from 100 nm to 400 nm.

14. The wavelength conversion device of claim 1, wherein a concentration of the nano particles in the reflective member is in a range substantially from 30 wt % to 95 wt %.

15. The wavelength conversion device of claim 14, wherein the concentration of the nano particles in the reflective member is further in a range substantially from 50 wt % to 90 wt %.

16. The wavelength conversion device of claim 1, wherein a difference between the refractive index of the continuous-phase material and the refractive index of the nano particles is equal to or greater than 0.5.

17. The wavelength conversion device of claim 1, wherein the nano particles comprise a plurality of first sub-nano particles and a plurality of second sub-nano particles, a refractive index of the first sub-nano particles is greater than the refractive index of the continuous-phase material, and a refractive index of the second sub-nano particles is smaller than the refractive index of the continuous-phase material.

18. The wavelength conversion device of claim 1, wherein the wavelength conversion member is a phosphor powder layer.

* * * * *